United States Patent Office 3,005,478
Patented Oct. 24, 1961

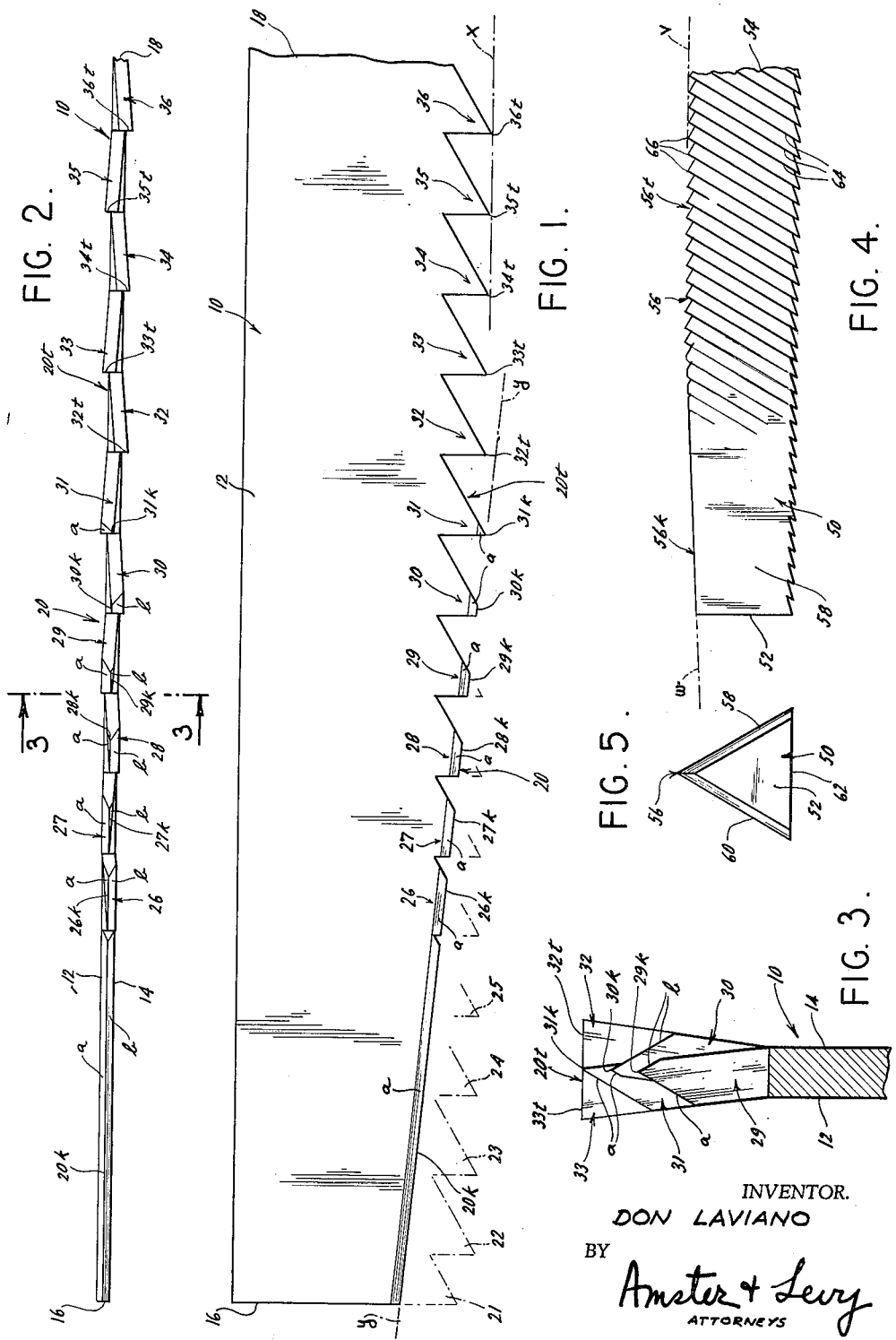

3,005,478
CUTTING IMPLEMENT
Don Laviano, 119 Washington Place, New York, N.Y.
Filed Oct. 9, 1958, Ser. No. 766,277
5 Claims. (Cl. 143—133)

The present invention relates generally to cutting implements, and in particular to an improvement in tools having blades with serrated or toothed cutting edges, as well as to a method for improving conventional cutting tools of that type.

In the past a problem has been encountered in starting to cut through plastics, wood, metal, or other work materials with a toothed cutting tool such as a saw or file. Generally the operator, in order to make the cut as close as possible to a desired cut line, first aligns the tool with that desired cut line and then begins to reciprocate it in the proper cutting stroke. Often, as the tool is just starting to cut into the work material, the riding of the cutting teeth thereover during the reciprocating cutting stroke causes the tool to bounce haphazardly. This haphazard bouncing tends to destroy the alignment of the tool with the desired cut line, so that a cut may be started in the wrong place, or the tool may chop into the work in a number of random places, leaving it in a ragged condition.

Once the tool is started in a cut, the walls of that cut will themselves serve to keep the tool in line therewith. Thus, the problem would be resolved if only some way could be found of locating the cut in the right place at the beginning, for thereafter the tool will automatically be retained in the proper alignment. For the same reason, it is very important not to allow the initial cut to become misaligned, because not only will the work be cut in an undesired place, but it will then be doubly difficult to make the cutting tool stay in proper alignment instead of slipping back into the misaligned cut.

Accordingly, it is generally an object of the present invention to obviate one or more of the aforesaid difficulties. It is specifically within the contemplation of the present invention to solve the problem of bouncing encountered in startinng a cut with a toothed implement, by providing an improved cutting implement which will not bounce as it is used to start a cut, whereby the implement will tend to retain its initial proper alignment with the desired cut line as it begins its incision into the work material.

Thus, in accordance with an illustrative article of manufacture demonstrating features and advantages of article aspects of the present invention, there is provided an improved cutting implement comprising a body having a starting end and a trailing end, and further having a cutting edge extending from the starting end toward the trailing end. The portion of the cutting edge contiguous to the starting end is formed to provide a smooth scoring portion, and an adjoining cutting portion thereof extending from the smooth scoring portion toward the trailing end is formed with a series of serrations which merge into the smooth scoring portion intermediate the starting and trailing ends. Advantageously, since it is the teeth or serrations of the cutting edge which cause the bouncing that gives rise to the problem, the provision of a smooth or unserrated portion on the starting end of the cutting edge will avoid bouncing and enable the tool to retain its initial proper alignment with the desired cut line as the starting end of the cutting edge is drawn across the work. Further, the forming of this starting end as a scoring portion results in a scoring of the work material as the starting end is drawn thereacross. Since the tool does not bounce out of its initial proper alignment while this smooth portion at the starting end of the cutting edge is scoring the work, the starting end cuts into the work a properly aligned guide notch. When, in continuation of the reciprocating cutting stroke, the adjoining serrated cutting portion on the trailing end of the cutting edge follows the scoring portion in being drawn across the work, it finds the previously prepared guide notch waiting to retain the tool in continued alignment therewith. The merging of the smooth scoring portion with the adjoining serrated cutting portion serves to introduce the serrated portion gradually into the guide notch so that no sudden bounce occurs to throw the cutting tool out of alignment with the guide notch before the serrated cutting portion has been introduced sufficiently far into the guide notch to cut it deep enough to improve its holding ability to the point where bouncing is no longer a problem. The serrated portion of the cutting edge may then be used to perform the remaining heavy cutting. The aforesaid article of manufacture may fall into any of the common categories of serrated cutting implements; for example, serrated knives, striated files, or toothed saws adapted for cutting plastics, wood, metal, or any other work material.

Further, in accordance with an illustrative method demonstrating features and advantages of method aspects of the present invention, there is provided a method of improving a cutting implement provided with a body having a cutting edge formed with a series of serrations comprising the steps of grinding a portion of the cutting edge to the shape of a smooth knife-edge, and grinding the serrations of an adjoining portion of the cutting edge to heights consecutively diminishing toward the smooth knife-edge such that the adjoining serrated portion merges into the smooth knife-edge. Advantageously, this enables all the great number of conventional cutting implements with serrated cutting edges now in use to be improved in accordance with the present invention by providing the cutting edges thereof with a smooth scoring portion and an adjoining serrated cutting portion merging thereinto for starting a properly aligned cut in the aforesaid manner. This modification can be accomplished quickly, easily, and cheaply, employing only ordinary grinding equipment such as is widely available, and with the exercise of common mechanical skill. This modification, furthermore, can be performed on any conventional cutting tool falling into any of the aforesaid common categories of serrated cutting implements.

The above brief description, as well as further objects, features and advantages of the present invention, may be best appreciated by reference to the following detailed specification of illustrative articles and methods in accordance with the present invention, when taken in conjunction with the accompanying drawings, wherein:

FIG. 1 is a side elevational view of a blade body of a saw in accordance with the present invention;

FIG. 2 is a plan view of the cutting edge of the saw blade of FIG. 1;

FIG. 3 is a cross-section of a portion of the saw blade of FIGS. 1 and 2 taken along the lines 3—3 of FIG. 2 looking in the direction of the arrows;

FIG. 4 is a side elevational view of the abrading body of a file in accordance with the present invention; and, FIG. 5 is an end elevational view of the file of FIG. 4.

Referring now specifically to FIGS. 1 through 3 of the drawings, it is seen that the blade body 10 of a wood-cutting saw is provided with two substantially planar sides 12 and 14. The blade body 10 has a starting end 16 which is used for starting a cut, and a trailing end 18 which trails the starting end 16 into the cut started by the latter as the saw is reciprocated in the cutting stroke. In the illustrated embodiment of the saw the starting end 16 is shown at an end of the blade body 10 to which no handle is attached, but it will be appreciated that if it is desired to start a cut with the end of a blade to which a handle is attached then that end may be formed as the starting end and the other as the trailing end. In either case, a cutting edge 20 of the blade 10 extends from the starting end 16 toward the trailing end 18 thereof.

In a conventional wood saw blade, the cutting edge 20 is formed with a series of serrations or cutting teeth 21 through 36 etc., all of which are similar to cutting teeth 32 through 36 etc., the outline of the first cutting teeth 21 through 31 of the series being suggested by the broken lines of FIG. 1. These cutting teeth 21 through 36 etc. of a conventional wood saw blade are of substantially uniform height, and are all formed with tips $21t$ through $36t$ etc. of blunt cross-section, such as may be seen by referring to cutting teeth 32 through 36 of FIGS. 2 and 3. It may be that a first set of alternate cutting teeth 21, 23, 25, etc. of the series of a conventional saw blade is slanted in a first sideward direction relative to the plane of the first side 12 of the blade 10, and a second set of alternate teeth 22, 24, 26, etc. of the series interspersed with the first set 21, 23, 25 etc. is similarly slanted in a second sideward direction relative to the plane of the second side 14 of the blade 10, the cutting teeth having substantially uniform maximum sideward displacements from the planes of the first and second sides 12 and 14 respectively, as may be appreciated by again referring to cutting teeth 32 through 36 etc. of FIGS. 2 and 3, in accordance with the familiar feature involving the toeing-out of successive teeth in alternate directions frequently found on saw blades. Both the bluntness of the tips of the cutting teeth and their toed-out disposition contribute to the bouncing of a conventional saw blade which makes it difficult to start a cut therewith.

In an illustrative saw blade in accordance with the present invention, however, the portion of the cutting edge 20 contiguous to the starting end 16 is formed to provide a smooth scoring portion or knife-edge $20k$. An adjoining portion $20t$ of the cutting edge 20 extending from the smooth knife-edge $20k$ toward the trailing end 18 is formed with a series of cutting teeth 26 through 36 etc., but only the cutting teeth 32 through 36 etc. nearest the trailing end 18 are of substantially uniform height and are formed with tips $32t$ through $36t$ etc. of blunt cross-section. In an illustrative saw blade in accordance with the present invention reduced cutting teeth 26 through 31 nearest the smooth knife-edge $20k$ are formed to provide knife-edges $26k$ through $31k$ at the tips thereof and the heights and (in event that the alternating toe-out feature is incorporated therein) the maximum sideward displacement therefrom the planes of the first and second sides 12 and 14 respectively consecutively diminish toward the smooth knife-edge $20k$ such that the adjoining serrated or toothed portion $20t$ of the cutting edge 20 merges into the smooth knife-edge $20k$ thereof. In this way all three characteristics which may help cause the serrated cutting portion $20t$ of a saw blade 10 to bounce, namely the serrated configuration thereof, the bluntness of the tips of the individual serrations, and the alternate toeing-out thereof, are consecutively diminished to cause the serrated portion $20t$ to merge into the knife-edge of the smooth scoring portion $20k$. The knife-edge $20k$ is adapted to start a guide notch which is in alignment with the desired cut line. The serrated cutting portion $20t$ may subsequently be drawn into the guide notch with a gradually increasing engagement of the work material by the series of reduced cutting teeth 26, 27, 28, 29, 30, and 31 in that order until finally they make in the work material a cut large enough to prevent the saw blade 10 from being bounced out of alignment therewith when the unreduced cutting teeth 32 through 36 etc. are drawn therethrough to do the heavy ripping necessary to finish the cut. It will be appreciated that, although the blade body 10 shown in FIGS. 1 through 3 for purposes of illustration is a particular type of wood saw blade having toed-out teeth, the present invention is equally applicable to any other type of wood saw whether of the cross-cut, rip, or any other variety, and to coping saws, hack saws and jewelers saws and all other metal-cutting saws as well as to saws adapted for cutting plastics and any other work material, and it is further applicable to saws which have in-line instead of toed-out teeth, as well as to serrated knives and all other manner of toothed cutting implements, without limitation.

In order that any conventional toothed saw or other serrated cutting implement of any of the aforesaid types may be modified in accordance with the present invention, there is provided an illustrative method of improving a conventional saw or serrated cutting implement provided with a blade body 10 such as was described above, with the cutting edge 20 thereof adjoining both sides 12 and 14 of the blade body 10, and all the cutting teeth 21 through 36 etc. thereof being disposed along a line $x$, being formed with tips $21t$ through $36t$ etc. of blunt cross-section, and, if they are disposed in a toed-out arrangement, having substantially uniform maximum displacements from the planes of the first and second sides 12 and 14 respectively. This method includes the step of employing an ordinary grinding tool in the well-known manner to grind to a knife-edge the portion of the cutting edge 20 of the blade body 10 contiguous to the starting end 16 thereof. It further includes the step of holding the blade body 10 and the grinding tool in a first angular relationship to each other such that the cutting edge 20 is ground down to a line $y$ at an angle to the line $x$ of the cutting teeth 21 through 36 etc. and which projects entirely beyond the blade body 10 near the trailing end 18 thereof, slants across the cutting edge 20 and reduces or truncates the cutting teeth 26 through 31 intermediate the starting end 16 and the trailing end 18 at heights consecutively diminishing toward the starting end 16, and near the starting end 16 extends across the blade body 10 behind the cutting teeth 21 through 25, entirely eliminating them to reduce the cutting edge to a smooth configuration at $20k$. Other steps included in the method involve holding the blade body 10 and the grinding tool in a second angular relationship to each other to grind the cutting edge 20 adjacent the first side 12 of the blade body 10 down to a first plane defined by surfaces $a$ which is at an angle to the plane of the first side 12, and holding the blade body 10 and the grinding tool in a third angular relationship to each other to grind the cutting edge 20 adjacent the second side 14 of the blade body 10 down to a second plane defined by surfaces $b$ which is at an angle to the first plane and to the plane of the second side 14, such that the tips of the truncated or reduced teeth 26 through 31 and the smoothly ground portion $20k$ are ground to provide knife-edges, and the truncated or reduced teeth 26, 28, and 30 of the first set and 27, 29, and 31 of the second set are ground to maximum sideward displacements from the planes of the first and second sides 12 and 14 respectively which consecutively diminish toward the starting end 16 of the blade body 10. In this way the teeth of any conventional saw blade can be made to diminish toward the starting end thereof in respect of their height, toe-out, and bluntness so as to merge into a smooth, knife-edged scoring portion in accordance with the present invention, usable for starting a properly aligned cut. It will be appreciated that, although an illustrative method was described in connection with a wood saw having toed-out teeth, the method aspects of this invention are equally applicable to the same aforesaid broad classes of serrated cutting implements as are the article aspects.

In particular the present invention is applicable to striated files having a well-defined cutting edge. Referring now specifically to FIGS. 4 and 5, it is seen that a file includes an abrading body 50 having a starting end 52 and a trailing end 54. The abrading body 50 has a cutting edge 56 extending from the starting end 52 to the trailing end 54, and may have any cross-sectional shape which provides a sharp vertex for defining the cutting edge 56, such as the triangular configuration bounded by sides 58, 60, and 62, as best seen in FIG. 5.

In a conventional file, the entire operating length of the sides 58, 60, and 62 of the abrading body 50 may be formed with a series of ridges or striations 64 which continue thereacross until they project from the entire operating length of the cutting edge 56 as a series of cutting teeth 66 formed thereon, in a manner illustrated by the striations and cutting teeth nearest the trailing end 54 of abrading body 50, all the cutting teeth 66 of a conventional file being of substantially uniform height.

In an illustrative improved file in accordance with the present invention, however, the portion of the cutting edge 56 contiguous to the starting end 52 of the abrading body 50 is formed to provide a smooth knife-edge 56k, and only an adjoining portion 56t of the cutting edge 56 extending from the smooth knife-edge 56k toward the trailing end 54 of the abrading body 50 is formed with a series of cutting teeth 66, of which only those nearest the trailing end 54 of the abrading body 50 are of substantially uniform height, while the cutting teeth 66 nearest the smooth knife-edge 56k consecutively diminish in height toward the smooth knife-edge 56k such that the adjoining toothed portion 56t merges into the smooth knife-edge 56k.

A file in accordance with the present invention can be made from any conventional file provided with an abrading body 50 having a starting end 52, a trailing end 54, and a cutting edge 56 extending from the starting end 52 toward the trailing end 54 and formed with a series of cutting teeth 66 disposed along a line v. An illustrative method of improving such a file in accordance with the present invention includes the step of employing a grinding tool to grind to a knife-edge the portion of the cutting edge 56 contiguous to the starting end 52 of the abrading body 50, and the step of holding the abrading body 50 and the grinding tool in an angular relationship to each other such that the cutting edge 56 is ground down to a line w at an angle to the line v of the cutting teeth 66 and which projects entirely beyond the abrading body 50 near the trailing end 54 thereof, slants across the cutting edge 56 and reduces or truncates a plurality of the cutting teeth 66 intermediate the starting end 52 and the trailing end 54 of the abrading body 50 at heights consecutively diminishing toward the starting end 52, and near the starting end 52 extends across the abrading body 50 behind the cutting teeth 66 and entirely eliminates them to reduce the cutting edge 56 to a smooth configuration at 56k.

It will now be appreciated that a file in accordance with article aspects of the present invention or a conventional file improved in accordance with method aspects of the present invention will have a smooth knife-edge 56k adapted to start a properly aligned guide notch without bouncing, and a trailing serrated cutting portion 56t merging thereinto for subsequent gradual introduction thereof into the guide notch for further cutting once the guide notch is established.

It will also be appreciated that the operations involved in the method aspects of this invention can be performed on any conventional serrated saw, file or other cutting implement having a well-defined cutting edge, and can be performed quickly, easily, and cheaply, with an ordinary grinder, by any person capable of grinding a tool. Thus the present invention is usable by millions of people for improving in accordance therewith millions of conventional cutting implements now in use, which feature greatly enhances the scope of applicability, and therefore the utility, of this invention.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. An improved saw comprising a blade body having two substantially planar sides, a starting end, a trailing end, and a cutting edge extending from said starting end toward said trailing end, the portion of said cutting edge contiguous to said starting end being formed to provide a smooth knife-edge, and an adjoining portion of said cutting edge extending from said smooth knife-edge toward said trailing end and being formed with a series of cutting teeth, a first set of alternate teeth of the series slanting in a first sideward direction relative to the plane of a first side of the blade body and a second set of alternate teeth of the series interspersed with said first set slanting in a second sideward direction relative to the plane of a second side of the blade body, said cutting teeth nearest said trailing end being of substantially uniform height, having substantially uniform maximum sideward displacements from the planes of said first and second sides respectively, and being formed with tips of blunt cross-section, said cutting teeth nearest said smooth knife-edge being formed to provide knife-edged tips and the heights and the maximum sideward displacements thereof from the planes of said first and second sides respectively consecutively diminishing toward said smooth knife-edge such that said adjoining portion merges continuously into said smooth knife-edge.

2. An improved cutting implement comprising a body having two substantially planar sides, a starting end, a trailing end, and a cutting edge extending from said starting end toward said trailing end, the portion of said cutting edge contiguous to said starting end being formed to provide a smooth knife-edge, and an adjoining portion of said cutting edge extending from said smooth knife-edge toward said trailing end and being formed with a series of cutting teeth, a first set of teeth of the series slanting in a first sideward direction relative to the plane of a first side of the body and a second set of teeth of the series interspersed with said first set slanting in a second sideward direction relative to the plane of a second side of the body, said cutting teeth nearest said trailing end being of substantially uniform height, said cutting teeth nearest said smooth knife-edge being formed to provide knife-edged tips, the heights of said cutting teeth nearest said smooth knife-edge consecutively diminishing toward said smooth knife-edge such that said adjoining portion merges continuously into said smooth knife-edge.

3. An improved cutting implement comprising a body having two substantially planar sides, a starting end, a trailing end, and a cutting edge extending from said starting end toward said trailing end, the portion of said cutting edge contiguous to said starting end being formed to provide a smooth knife-edge, and an adjoining portion of said cutting edge extending from said smooth knife-edge toward said trailing end and being formed with a series of cutting teeth, a first set of teeth of the series slanting in a first sideward direction relative to the plane of a first side of the body and a second set of teeth of the series interspersed with said first set slanting in a second sideward direction relative to the plane of a second side of the body, said cutting teeth nearest said trailing end being of substantially uniform height and having substantially uniform maximum sideward displacements, said cutting teeth nearest said smooth knife-edge being formed to provide knife-edged tips and the heights and the maximum sideward displacements thereof consecutively diminishing toward said smooth knife-edge such that said adjoining portion merges continuously into said smooth knife-edge.

4. An improved cutting implement comprising a body having a substantially planar side, a starting end, a trailing end and a cutting edge extending from said starting end toward said trailing end, the portion of said cutting edge contiguous to said starting end being formed to provide a smooth knife-edge, and an adjoining portion of said cutting edge extending from said smooth knife-edge toward said trailing end and being formed with a series of cutting teeth, a first set of teeth of the series slanting in a first sideward direction relative to the plane of said side of the body and a second set of teeth of the series interspersed with said first set slanting in a second sideward direction, said cutting teeth nearest said trailing end being of substantially uniform height, having substantially uniform maximum sideward displacements from the planes of said first and second sides respectively, said cutting teeth nearest said smooth knife-edge being formed to provide knife-edged tips and the heights and the maximum sideward displacements thereof, from the planes of said first and second sides respectively, consecutively diminishing toward said smooth knife-edge such that said adjoining portion merges continuously into said smooth knife-edge.

5. An improved cutting implement comprising a body having two substantially planar sides, a starting end, a trailing end, and a cutting edge extending from said starting end toward said trailing end, the portion of said cutting edge contiguous to said starting end being formed to provide a smooth knife-edge, and an adjoining portion of said cutting edge extending from said smooth knife-edge toward said trailing end and being formed with a series of cutting teeth, a first set of teeth of the series slanting in a first sideward direction relative to the plane of a first side of the body and a second set of teeth of the series interspersed with said first set slanting in a second sideward direction relative to the plane of a second side of the body, said cutting teeth nearest said trailing end being of substantially uniform height, having substantially uniform maximum sideward displacements from the planes of said first and second sides respectively, and being formed with tips of blunt cross-section, said cutting teeth nearest said smooth knife-edge being formed to provide knife-edged tips and the heights and the maximum sideward displacements of said last-mentioned teeth, from the planes of said first and second sides respectively, consecutively diminishing toward said smooth knife-edge such that said adjoining portion merges continuously into said smooth knife-edge.

References Cited in the file of this patent

UNITED STATES PATENTS

| | | |
|---|---|---|
| Re. 14,615 | Rasmussen | Mar. 18, 1919 |
| 45,009 | Alexander | Nov. 15, 1864 |
| 685,772 | Lapointe | Nov. 5, 1901 |
| 1,379,973 | Gillespie | May 31, 1921 |
| 2,293,286 | Fenner | Aug. 18, 1942 |
| 2,467,327 | McKee | Apr. 12, 1949 |
| 2,517,840 | Chatlos | Aug. 8, 1950 |
| 2,703,993 | Staggers | Mar. 15, 1955 |
| 2,760,266 | Sanders | Aug. 28, 1956 |
| 2,867,137 | Joy | Jan. 6, 1959 |

FOREIGN PATENTS

| | | |
|---|---|---|
| 485,950 | Great Britain | May 27, 1938 |
| 741,168 | France | Feb. 8, 1933 |
| 50,480 | Norway | Apr. 4, 1932 |